Feb. 6, 1962 J. J. CHRISTENSON 3,019,926
STRADDLE TRAILER
Filed Oct. 24, 1957 2 Sheets-Sheet 1

INVENTOR.
JAMES JULIUS CHRISTENSON
BY
Jesse P. Whann
ATTORNEY

Feb. 6, 1962   J. J. CHRISTENSON   3,019,926
STRADDLE TRAILER
Filed Oct. 24, 1957   2 Sheets-Sheet 2
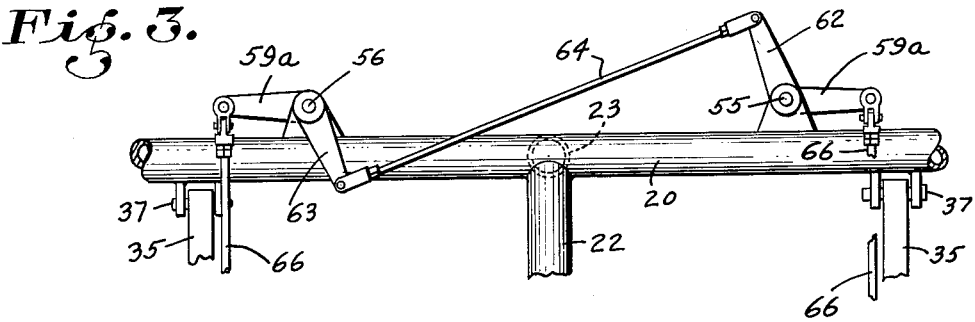
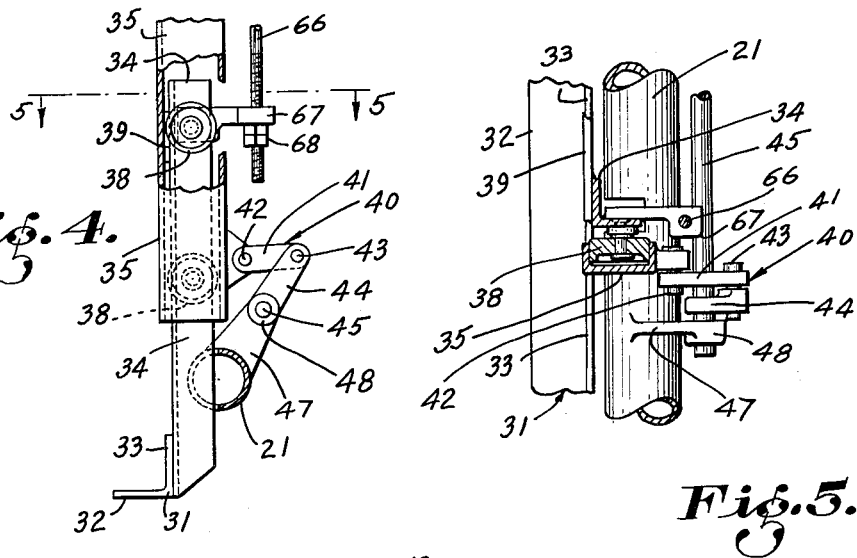
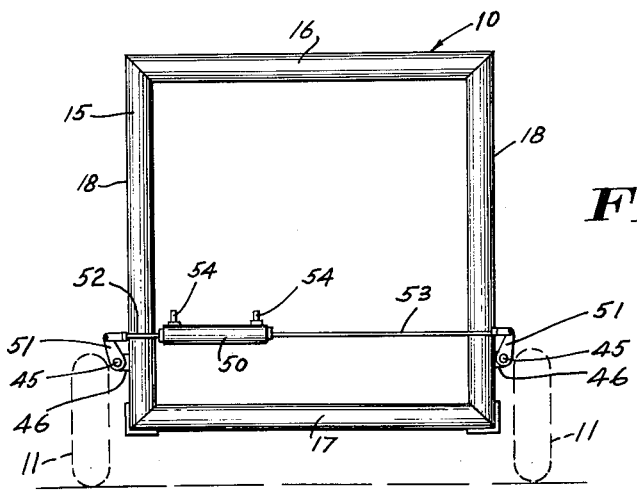
INVENTOR.
JAMES JULIUS CHRISTENSON
BY
ATTORNEY United States Patent Office 3,019,926
Patented Feb. 6, 1962

3,019,926
STRADDLE TRAILER
James Julius Christenson, Cowiche, Wash., assignor to Towmotor Corporation, Cleveland, Ohio, a corporation of Ohio
Filed Oct. 24, 1957, Ser. No. 692,114
1 Claim. (Cl. 214—392)

This invention relates to a wheeled carrier adapted to rapidly pick up and transport loads from place to place, and relates in particular to a wheeled carrier of the straddle type adapted to be moved into a position over the load and having simple means for picking up the load, whereupon movement of the carrier will effect transportation of the load as may be desired.

It is an object of the invention to provide a carrier which may be operated at relatively high speeds over public roads. It may be driven safely over public highways at speeds at least as high as those permitted for trucks.

The invention has especial utility where the load is of such character that it must be transported in a minimum of time from the loading place to its destination. For example, in the fruit growing areas, the rapid handling and transportation of the fruit after it has been picked is of major importance. If the fruit is to be canned or preserved, rapid transportation of it from the orchard to the packing plant is made possible by the invention. In view of this, the fruit may be picked in riper state and, therefore, a better flavor and sugar content. This also applies where the fruit is to be sold fresh in the markets. It may be picked in nearly ripe condition and then transported quickly from the orchard to the refrigerated rooms or railroad cars of the wholesaler, minimizing the possibility of the product becoming spoiled, yet supplying it to the consumer in ripened condition.

It is an object of the invention to provide a wheeled carrier in the form of a trailer which may be attached to automotive means, such as a power driven truck, said carrier having a chamber open along its bottom and at one end thereof so that it may be moved into a position surrounding the load. The carrier is equipped with simple means for picking up the load from the floor or ground and supporting the same in raised position as long as may be desired. With the load supported therein in this manner, the carrier is wheeled to its destination, where the mechanism is operated to lower the load onto suitable supports arranged upon the floor. The carrier is then completely separated from the load by moving it longitudinally.

It is a further object of the invention to provide a carrier having means of simple character for engaging opposite sides of the load and then raising it from its support, including simple means for equalizing or correlating the movements and positions of the load lifting mechanism, both with respect to the movement of its load engaging parts horizontally into engagement with the load and the vertical movement required to raise and lower the load within the chamber of the carrier.

Further objects and advantages of the invention may be brought out in the following part of the specification wherein the parts of the embodiment are explained in detail for the purpose of providing a complete and readily understood disclosure without, however, intending to limit the scope of the invention which is defined by the appended claim.

Referring to the accompanying drawings which are for illustrative purposes only:

FIG. 3 is a fragmentary sectional view showing the means for correlating the rotation of the transverse shafts of the load lifting mechanism;

FIG. 4 is an enlarged fragmentary sectional view taken as indicated by the line 4—4 of FIG. 1;

FIG. 5 is a fragmentary sectional view taken as indicated by the line 5—5 of FIG. 4; and FIG. 6 is a front end view of the trailer showing the power unit for moving the load engagers of the invention into engagement with the load which is to be lifted.

Figure 1:
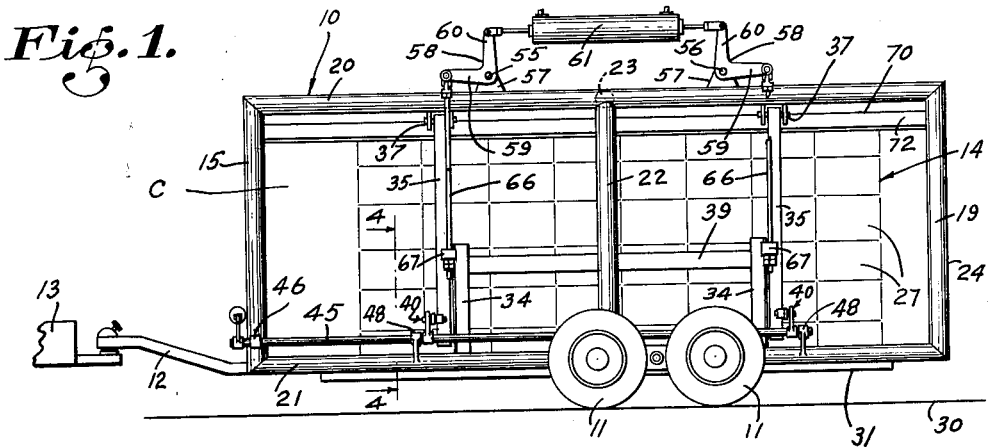
FIG. 1 is a side view of a preferred embodiment of the invention.
Figure 2:
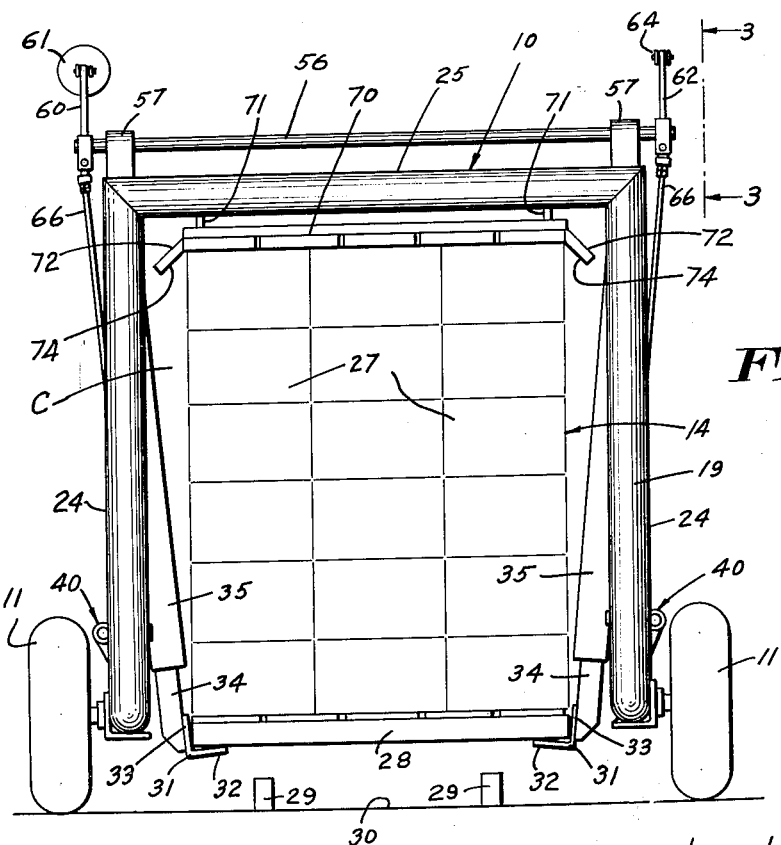
FIG. 2 is a view, to enlarged scale, taken from the rear end of the trailer shown in FIG. 1.

Referring first to FIGS. 1 and 2, the straddle carrier of the invention includes a frame structure 10, supported by wheels 11 and having at its forward end a hitch 12 whereby it may be connected to a pulling vehicle 13 so that a load 14, carried within the structure 10 may be moved to a selected destination. The frame or body structure 10 includes a rectangular front frame 15 comprising top and bottom horizontal members 16 and 17, and vertical side members 18 which connect the ends of the top and bottom members. The structure 10 also includes a rear frame 19 and horizontal beams 20 and 21 which connect the corners of the front frame 15 with the corners of the rear frame 19. The upper and lower horizontal beams 20 and 21 are connected by intermediate posts 22 and the spaced longitudinal beams 20 are connected by an upper transverse beam 23 which cooperates with the legs or posts 22 to form a rigid arch in the center of the structure 10. The rear frame 19 is in the form of an arch. It includes spaced vertical posts 24, the lower ends of which are connected to the lower horizontal beams 21 and the upper ends of which are connected to the upper beams 20, and a transverse beam 25, the ends of which are connected to the contiguous ends of the beams 20 and the posts 24.

The relatively large, longitudinally elongated chamber C defined by the structure 10 is open along its bottom and at its rear end for the reason that, rearwardly of the lower transverse beam 17 of the front frame 15, there are no structural members extended across the lower portion of the chamber C; therefore, the trailer may be moved rearwardly or backed up so as to bring the trailer structure into a position surrounding the load 14. The load 14 is shown as consisting of a stack of boxes 27 which are supported on pallets 28 which, before the load 14 is raised into the position in which it is shown in FIGS. 1 and 2, rests upon rails 29 or other supports which are arranged upon the ground or floor 30, as shown in FIG. 2. The carrier includes load engagers 31 having longitudinal shelves 32 adapted to be moved horizontally into positions wherein they project under the edges of the pallets 28, as shown in FIG. 2.

The engagers 31 also are made from structural angles and include substantially vertical walls 33 which engage the lower extremities of the side faces of the load, as shown in FIG. 2.

Lifting means for effecting substantially vertical movement of the engagers 31 so as to raise the load 14 from the supporting means consisting of the rails 29, includes a pair of upright bars 34, made from structural angles, as shown in FIG. 5, which bars extend upwardly from spaced points along the engagers 31 to cooperate with guides 35 which are positioned, as shown in FIGS. 1 and 2, and are hung from hinges 37, secured to the lower portions of the upper longitudinal beams 20. As shown in FIG. 5, each of these guides 35 consists of a steel channel, and each of the bars 34 has thereon a pair of vertically spaced rollers 38 resting in the channel portion of the contiguous guide 35. The lower ends of the bars 34 are connected to the members 31, and the upper ends of the bars 34 are interconnected by a horizontal tie member 39.

The members 31 are moved toward and away from the load by toggles 40 which are connected to the lower portions of the guides 35, and act to swing the guides on the hinges 37. As best shown in FIGS. 4 and 5, each toggle 40 consists of a link 41 which is connected to a pin 42 to the lower portion of a guide 35, and by a pin 43 to the swinging end of a lever 44 fixed on a horizontal, longitudinal shaft 45. There are two of these shafts 45 positioned as shown in FIGS. 1 and 6, extending through front bearings 46 which are mounted on the lower ends of the post 15 and by second and third bearings 47 and 48 which are mounted on the lower longitudinal beams 21. The levers 44 are fixed on the shafts 45 adjacent the bearings 48, and oscillation of the shafts 45 is employed to swing the levers 44 so as to transmit through the links 41 movements which will swing the lower ends of the guides 35 inwardly, thereby moving the shelves 32 of the engagers 31 under the longitudinal lower edges of the load 14. Oscillation of the shafts 45 is accomplished by a double acting hydraulic cylinder 50 which, as shown in FIG. 6, is connected between levers 51 which are fixed on the front ends of the shafts 45 in upwardly projecting positions. The hydraulic cylinder 50 is connected by link elements 52 and 53 extending across the lower portion of the front frame 15 with the upper ends of the levers 51. Hose connections 53 and 54 are shown on the hydraulic cylinder 50 to which hose members (not shown) are connected for actuating the hydraulic cylinder so as to swing the levers 51 simultaneously inwardly toward each other to effect a swinging of the load engagers 31 laterally inwardly into engagement with the load, or to rotate the levers 51 simultaneously outwardly, thereby moving the engagers 31 away from the load.

For lifting of the load, the carrier has transverse shaft members 55 and 56, supported by bearing 57 extending across the top of the structure 10 in operative relation to the upper ends of the guides 35. On adjacent ends of the shafts 55 and 56 bell cranks 58 are fixed with their lower levers 59 extending in generally horizontal direction, and with their remaining levers 60 projecting upwardly. A hydraulic cylinder 61 is connected to the levers 60 and is operative to swing them toward and away from each other, thereby oscillating the transverse shafts 55 and 56. On the opposite ends of the shafts 55 and 56, as shown in FIGS. 2 and 3, levers 59a are fixed which are similar in size and location to the levers 59. Other levers 62 and 63 are respectively fixed on the shafts 55 and 56 in diagonally upwardly and downwardly directions and toward a transverse vertical plane between and parallel to the shafts 55 and 56. The link 64 is arranged with relation to the levers 62 and 63 so as to lie on a line approximately perpendicular to the center lines of the levers 62 and 63. The levers 62 and 63 and the link 64 constitute a linkage between the shafts 55 and 56 for correlating the oscillatory movements of the shafts. That is to say, when the shaft 55, FIG. 3, is rotated in counterclockwise direction to lift the lever 59a thereon, the shaft 56 will be oscillated in clockwise direction to swing its lever 59a upwardly at the same rate.

From the ends of the levers 59 and 59a links or lift rods 66 are extended downwardly for connection to the bars 34 in order that lifting of the rod 66 will effect lifting of the load engagers 31. As shown in FIGS. 4 and 5 brackets 67 are fixed on the bars 34 in outwardly extended positions as shown in FIGS. 4 and 5. The brackets 67 have openings therein through which the lower ends of the lift rods 66 extend, and nuts 68 threaded onto the lower ends of the rod 66 provide means for adjustably connecting the rods 66 to the brackets 67 so that when the rods 66 are lifted the lifting effect will be transmitted through the brackets 67 and the bars 34 to the engagers 31.

The operation of the carrier mechanism, after the structure 10 has been moved into a position to contain the load 14 consists in first actuating the hydraulic cylinder 50 so as to swing the engagers 31 inwardly toward each other and bring the shelves 32 thereof into positions under the lower edges of the load. Then, the hydraulic cylinder 61 is actuated to oscillate the shafts 55 and 56 in a direction to raise the lift rods 66, thereby lifting the engagers 31 so that the load will be raised into an elevated position, as shown in FIGS. 1 and 2.

The invention provides means for stabilizing the upper portion of the load. This means consists of a ceiling member 70 supported from the upper transverse members 16, 23 and 25 of the structure 10 by tie bolts 71, and being positioned so that as the load is raised, the top thereof will be brought into engagement with the member 70. The stabilizing member 70 is equipped with guide flanges 72 which are directed diagonally downwardly and outwardly as shown in FIG. 2. These flanges provide sloping faces 74 which will engage portions of the load 14, such as boxes, which may be displaced laterally, and will act to centralize such laterally displaced portions as the upper extremity of the load 14 is brought into engagement of the stabilizing member 70.

I claim:

In a straddle carrier: a wheeled structure defining a chamber which is open along the bottom and at one end, said structure comprising a front upright rectangular frame and a rear frame comprising a transverse top beam and legs extending downwardly from the ends thereof, horizontal upper side beam members connecting said front and rear frames, and intermediate members connecting intermediate portions of said horizontal beam members; vertical guides spaced along the opposite sides of said chamber having fixed pivots at their upper ends on the adjacent of said horizontal beam members for swinging movement of their lower ends transversely of the chamber; load engagers on opposite sides of said chamber, the engager being telescopically supported in the lower ends of the guide on that side for swinging movement therewith as a unit inwardly from retracted positions to engage the load; power means operative to move said load engagers laterally into engagement with the load, said power means comprising longitudinal shafts extending along the sides of said structure, means operative to simultaneously oscillate said shafts, and toggles connecting said shafts and the lower ends of said guides for moving said guides and associated engagers back and forth in response to oscillation of said shafts; means for lifting said load engagers so as to raise the load within said chamber, said lifting means comprising a pair of transverse shaft members supported across the upper portion of said structure, vertical levers fixed on said transverse members, horizontally directed levers connected to said shaft members, linkage means connecting said shaft members so that they will oscillate in unison, link members connecting said horizontally directed levers to said load engagers so that said load engagers will be raised and lowered by telescopic movement with respect to the guide supports as said shaft members are oscillated, and fluid motor means connected to said vertical levers for reciprocating the same and thereby imparting oscillation to said shaft members; and ceiling means in the upper portion of said chamber for engagement by said load when it is lifted, said last named means having inclined load guiding flange members along the longitudinal edges thereof for deflecting an engaged load in a direction towards the central axis of the chamber.

References Cited in the file of this patent

UNITED STATES PATENTS

| | | | |
|---|---|---|---|
| D. 146,560 | Dimick | Apr. 8, | 1947 |
| 1,209,209 | Ross | Dec. 19, | 1916 |
| 1,457,025 | Gerlinger | May 29, | 1923 |
| 1,609,018 | Gerlinger | Nov. 30, | 1926 |
| 1,679,638 | Eastham | July 10, | 1928 |
| 1,798,412 | Grab | Mar. 31, | 1931 |
| 1,973,030 | Webber | Sept. 11, | 1934 |
| 2,442,994 | Clary | June 8, | 1948 |
| 2,573,342 | Knox | Oct. 30, | 1951 |
| 2,807,493 | Ryan et al. | Sept. 24, | 1957 |